(12) United States Patent
Tanaka

(10) Patent No.: US 6,308,271 B2
(45) Date of Patent: *Oct. 23, 2001

(54) METHOD AND SYSTEM OF CONTROLLING USAGE OF SIMULATOR AND RECORDING MEDIUM STORING PROGRAM FOR CONTROLLING USAGE OF SIMULATOR

(75) Inventor: Nozomu Tanaka, Tokyo (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/083,047

(22) Filed: May 22, 1998

(30) Foreign Application Priority Data

Oct. 30, 1997 (JP) .................................................... 9-299142

(51) Int. Cl.[7] ....................................................... G06F 11/30
(52) U.S. Cl. ............................. 713/200; 434/218; 714/38
(58) Field of Search ................................... 713/200, 201; 380/4; 345/112, 508; 707/203; 434/218; 714/30, 38, 39, 47

(56) References Cited

U.S. PATENT DOCUMENTS

| 5,306,154 | * | 4/1994 | Ujita et al. ............................ 434/218 |
| 5,815,820 | * | 10/1998 | Heinz et al. .......................... 434/118 |
| 5,925,127 | * | 7/1999 | Ahmad ................................ 713/200 |

* cited by examiner

Primary Examiner—John A. Follansbee
(74) Attorney, Agent, or Firm—Staas & Halsey LLP

(57) ABSTRACT

A predetermined number of times that a simulator can be used for learning is set. Every time the simulator is used, a count indicating the number of times that the simulator is already used is incremented. When the count is lower than or equal to the predetermined number of times, a simulation condition for use in a simulation is randomly set, and, when the count exceeds the predetermined number of times, a fixed simulation condition continues to be used in subsequent sessions of the simulation.

17 Claims, 7 Drawing Sheets

| USAGE FREQUENCY TABLE |
|---|
| USAGE FREQUENCY :   N |
| PERMITTED USAGE FREQUENCY :   P |

| No | SIMULATION CONDITION | CORRECT ANSWER |
|---|---|---|
| 1 | SIMULATION CONDITION A | CORRECT ANSWER a |
| 2 | SIMULATION CONDITION B | CORRECT ANSWER b |
| 3 | SIMULATION CONDITION C | CORRECT ANSWER c |
| ⋮ | ⋮ | ⋮ |
| m | SIMULATION CONDITION M | CORRECT ANSWER m |

| No | SIMULATION CONDITION | | CORRECT ANSWER | |
|---|---|---|---|---|
| 1 | SIMULATION CONDITION A | PERIOD BEFORE DEADLINE = 6 MONTHS | PROJECT SCALE = 8K STEPS | CORRECT ANSWER a | APPROPRIATE BUDGET = SEVENTY THOUSAND DOLLARS |
| 2 | SIMULATION CONDITION B | PERIOD BEFORE DEADLINE = 5 MONTHS | PROJECT SCALE = 7K STEPS | CORRECT ANSWER b | APPROPRIATE BUDGET = SIXTY THOUSAND DOLLARS |
| 3 | SIMULATION CONDITION C | PERIOD BEFORE DEADLINE = 7 MONTHS | PROJECT SCALE = 9K STEPS | CORRECT ANSWER c | APPROPRIATE BUDGET = EIGHTY THOUSAND DOLLARS |
| ... | ...... | | ...... | |
| m | SIMULATION CONDITION M | PERIOD BEFORE DEADLINE = 8 MONTHS | PROJECT SCALE = 10K STEPS | CORRECT ANSWER m | APPROPRIATE BUDGET = NINETY THOUSAND DOLLARS |

BUDGET COMPILATION SIMULATION

COMPILE A BUDGET ACCORDING TO THE SIMULATION CONDITION BELOW

| | |
|---|---|
| PERIOD BEFORE DEADLINE | FIVE MONTHS |
| PROJECT SCALE | 7K STEPS |

START COMPILING

FIG. 7

| FREQUENCY USED (N) | 1 | 2 | 3 | 4 | 5 |
|---|---|---|---|---|---|
| USED BY LICENSEE | SIMULATION CONDITION 7<br><br>CORRECT ANSWER 7 | SIMULATION CONDITION m<br><br>CORRECT ANSWER m | SIMULATION CONDITION m<br><br>CORRECT ANSWER m | SIMULATION CONDITION m | SIMULATION CONDITION m<br><br>CORRECT ANSWER m |
|  | NORMALLY, LEARNING TAKES PLACE ONCE, REPEATED FOR A SECOND TIME AT MOST | | THE SAME CONDITION IS REPEATEDLY USED. HOWEVER, THE LEARNER STILL BENEFITS FROM THE SIMULATION BY MODIFYING THE WAY THE LEARNER LEARNS. | | |
| USED BY NON-LICENSED LEARNER | SIMULATION CONDITION 9<br><br>CORRECT ANSWER 9 | SIMULATION CONDITION m<br><br>CORRECT ANSWER m | SIMULATION CONDITION m<br><br>CORRECT ANSWER m | SIMULATION CONDITION m | SIMULATION CONDITION m<br><br>CORRECT ANSWER m |
|  | NON-LICENSED USER CAN BENEFIT THE FIRST TIME | SINCE THE CORRECT ANSWER m IS DISTRIBUTED AMONG LEARNERS, TRAINING BECOMES DIFFICULT | | SINCE THE CORRECT ANSWER m FOR THE LEARNING CONDITION m IS DISTRIBUTED AMONG LEARNERS, | |

METHOD AND SYSTEM OF CONTROLLING USAGE OF SIMULATOR AND RECORDING MEDIUM STORING PROGRAM FOR CONTROLLING USAGE OF SIMULATOR

BACKGROUND OF THE INVENTION

1. Field of the Invention

The present invention generally relates to methods and systems of controlling usage of a simulator and recording mediums storing a program for controlling usage of a simulator. More particularly, the present invention relates to a method and system of controlling usage of a simulator for use in learning and a recording medium storing a program for such control, used in order to discourage usage, outside the terms and conditions specified in a license agreement, of the simulator by an unspecified number of learners (hereinafter, referred to as non-licensed learners) other than a licensed user.

Generally, training which uses a simulator is in great demand because it allows a learner to have a realistic experience and commit himself or herself to the process of learning. In some cases, a simulator sold to a user is used many times so that non-licensed learners benefit from the training using the simulator, thus reducing sales of simulators or discouraging a trainer from holding training courses. As a result, there is a demand for a system built into a simulator for preventing illegal usage.

2. Description of the Related Art

A license agreement of a simulator sold in the form of a removable recording medium such as a floppy disk or a CD-ROM usually gives a statement about illegal usage in order to prevent non-licensed learners from using the simulator.

For example, the following arrangements may be built into a program.

(1) Enable installation or execution only by a user who knows an ID.

(2) Enable a program to be started only when predetermined opportunities for learning have not been utilized (or only during a predetermined period of time).

Alternatively, a simulation condition may be randomly varied every time the program is started. Such a method is useful to prevent the process of learning from turning into a game by preventing methods and correct answers for obtaining good results from being circulated among learners under a fixed simulation condition.

Simply giving a statement about illegal use in a license agreement does not ensure that a corporate manager or the like in charge of the training will not use a simulator bought under the license agreement to exercise a training for non-licensed learners.

Accordingly, it is necessary to build a system for preventing illegal use into a simulator program. Assigning an ID is useless if a user at a training center or the like that bought the simulator discloses the ID to a learner.

Allowing the program to be started only until opportunities for learning have been utilized or only for a predetermined period of time prevents a learner from reviewing.

SUMMARY OF THE INVENTION

Accordingly, a general object of the present invention is to provide a system and method of controlling usage of a simulator, and a recording medium storing a program for controlling usage of a simulator, in which the aforementioned problems are eliminated.

Another and more specific object of the present invention is to provide a system and method of controlling usage of a simulator, and a recording medium storing a program for controlling usage of a simulator, in which a simulation condition is randomly varied until learning is repeated a predetermined number of times, and the simulation condition is fixed beyond the predetermined number of times, so that the use of the simulator to train non-licensed learners in a training program is discouraged.

Still another object of the present invention is to provide a system and method of controlling usage of a simulator, and a recording medium storing a program for controlling usage of a simulator, in which the frequency of usage is not updated when a learning session using the simulator is discontinued.

The aforementioned objects can be achieved by a method of controlling usage of a simulator sold to train a licensed user, for discouraging the simulator from being used by non-licensed learners beyond a predetermined number of times prescribed by a license agreement, comprising the steps of: setting a predetermined number of times that the simulator may be used; incrementing a count indicating a frequency of usage every time the simulator is used; setting a simulation condition of the simulator randomly while the count is lower than or equal to the predetermined number of times; and setting a fixed simulation condition of the simulator when the count exceeds the predetermined number of times.

The count may be prevented from being incremented when a use of the simulator is discontinued.

The aforementioned objects can also be achieved by a system of controlling usage of a simulator sold to train a licensed user, for discouraging the simulator from being used by non-licensed learners beyond a predetermined number of times prescribed by a license agreement, comprising: usage frequency incrementing means for incrementing a count indicating a frequency of usage every time the simulator is used; random condition setting means for setting a simulation condition of the simulator randomly while the count is lower than or equal to the predetermined number of times; and fixed condition setting means for setting a fixed simulation condition of the simulator when the count exceeds the predetermined number of times, wherein the system is contained in a computer-executable program.

The random condition setting means may include means for randomly generating, while the count is lower than or equal to the predetermined number of times, a reference number for referring to a table containing simulation conditions related to respective reference numbers and associated correct answers, and the fixed condition setting means may include means for setting a number for referring to the table, when the count exceeds the predetermined number of times.

The usage frequency incrementing means may include means for preventing the count from being incremented when a use of the simulator is discontinued.

The aforementioned objects can also be achieved by a recording medium containing a program for controlling usage of a simulator sold to train a licensed user by discouraging this simulator from being used by non-licensed learners beyond a predetermined number of times permitted in a license agreement, the program comprising: a usage frequency incrementing process for incrementing a count indicating a frequency of usage every time the simulator is used; a random condition setting process for setting a simulation condition of the simulator randomly while the count is lower than the predetermined number of times; and a fixed condition setting process of setting a fixed simulation condition of the simulator when the count reaches the predetermined number of times.

The random condition setting process may include a process for randomly generating, while the count is lower than or equal to the predetermined number of times, a reference number for referring to a table containing simulation conditions related to respective reference numbers and associated correct answers, and the fixed condition setting process may include a process for setting a number for referring to the table, when the count exceeds the predetermined number of times.

The usage frequency incrementing process may include a process for preventing the count from being incremented when a use of the simulator is discontinued.

According to the invention, by randomly setting the simulation condition until predetermined opportunities for learning have been utilized and setting a fixed simulation condition after the predetermined opportunities for learning have been utilized, the likelihood that the method or the correct answer is distributed among learners under the fixed simulation condition is increased, making it difficult for a trainer to execute a case-by-case simulation for non-licensed learners. With this arrangement, an illegal training whereby the simulator is used beyond a predetermined number of times prescribed in a contract proves undesirable.

By preventing the count indicating the number of the learning opportunities already utilized from being updated when the simulation has to be discontinued due to, for example, lack of time, it is possible to provide a service adapted for the actual usage.

BRIEF DESCRIPTION OF THE DRAWINGS

Other objects and further features of the present invention will be apparent from the following detailed description when read in conjunction with the accompanying drawings, in which:

FIG. 2 shows how a usage frequency table according to the invention is constructed;

FIG. 3 shows how a simulation condition/correct answer table according to the present invention is constructed;

FIG. 5 shows an example of the simulation condition/correct answer table according to the present invention;

FIG. 6 shows how the simulation condition is displayed according to the present invention; and FIG. 7 shows an example of usage of a simulator according to the present invention.

DETAILED DESCRIPTION OF THE PREFERRED EMBODIMENTS

Figure 1:
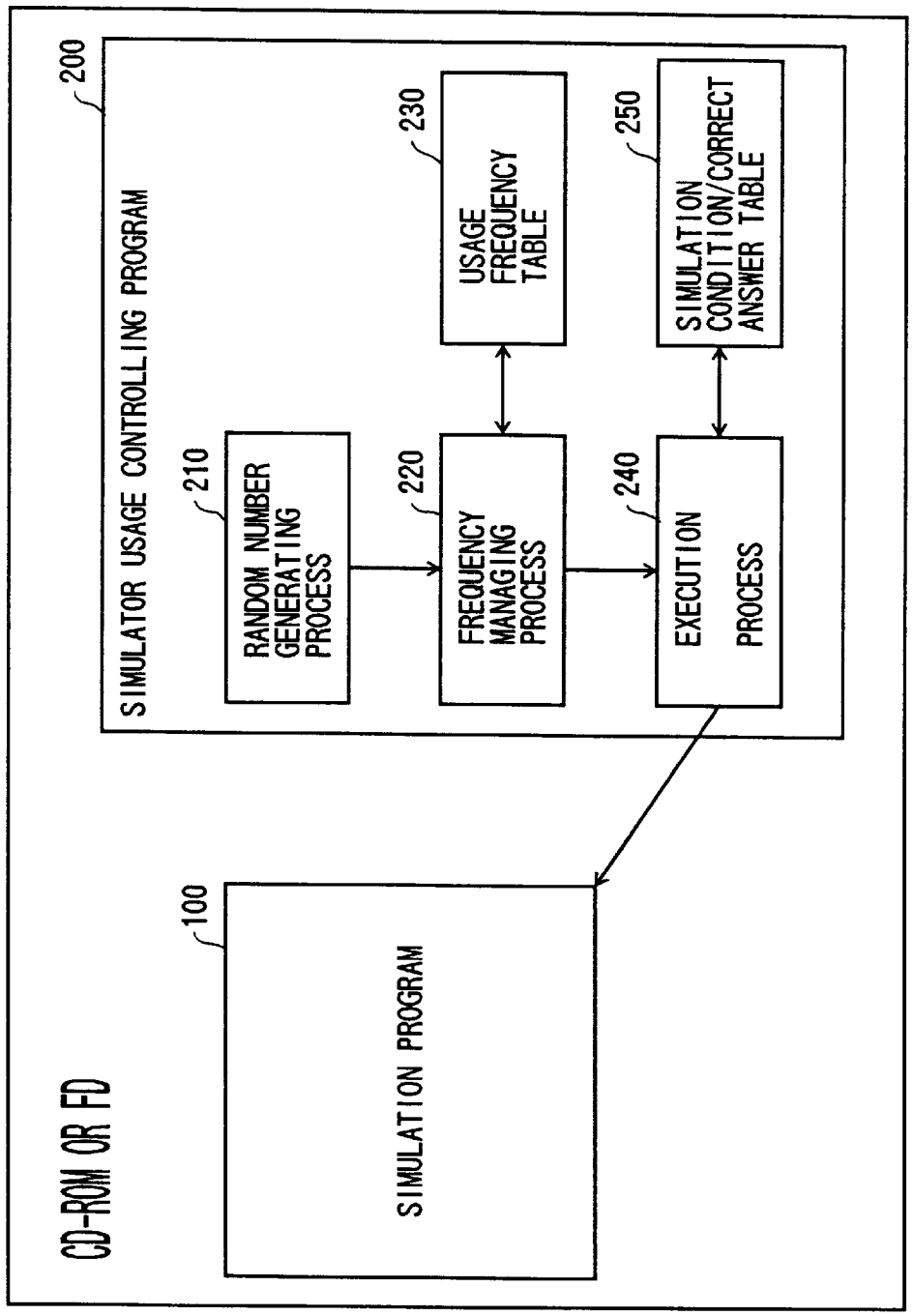
FIG. 1 is a schematic diagram showing a recording medium according to the present invention.

FIG. 1 is a schematic diagram showing a recording medium according to the present invention storing a program for controlling usage of a simulator. The recording medium may be of any type as long as copying to another medium is prevented.

A removable recording medium such as a floppy disk or a CD-ROM as shown in FIG. 1 stores a simulation program (simulator) 100 and a simulator usage controlling program 200 for controlling usage of the simulator. The programs 100 and 200 are independent of each other.

The simulator usage controlling program 200 includes a random number generating process 210, a frequency managing process 220, a usage frequency table 230, an execution process 240 and a simulation condition/correct answer table 250.

The random number generating process 210 generates a random number for randomly selecting a simulation condition from a simulation condition/correct answer table 250, based on data input by a learner, until a predetermined number of times is reached.

The frequency managing process 220 refers to the usage frequency table 230 as shown in FIG. 2 that stores a usage frequency N (actual number of times that learning is repeated) and a permitted usage frequency P, and compares the usage frequency N with the permitted usage frequency P. When the usage frequency N exceeds the permitted usage frequency P, the frequency managing process 220 requests the execution process 240 to refer to the fixed condition in the simulation condition/correct answer table 250.

When the usage frequency N is below or equal to the permitted usage frequency P, the execution process 240 refers to the simulation condition/correct answer table as shown in FIG. 3, by a random number generated by the random number generating process 210, so as to select a simulation condition. The execution process 240 executes a simulation using the selected simulation condition. When the usage frequency N exceeds the permitted usage frequency P, the fixed simulation condition in the simulation condition/correct answer table is retrieved so that the simulation is executed using the retrieved fixed simulation condition.

The simulation condition/correct answer table 250 comprises a simulation condition group randomly referred to by the execution process 240, and a simulation condition referred to thereby by a known reference number. In the example shown in FIG. 3, it is assumed that the simulation conditions 1–3 are referred to by a random number generated by the random number generating process 210, and a fixed simulation condition m is referred to by a known reference number m.

A description will now be given, with reference to a flowchart of FIG. 4, of an operation of the program for controlling usage of a simulator.

In step 101, a learner sets a recording medium such as a floppy disk or a CD-ROM in a drive, and inputs the date of learning and the name of the learner.

In step 102, the random number generating process 210 generates a random number based on data input by the learner, produces a random reference number by which the simulation condition/correct answer table 250 is referred to, and notifies the frequency managing process 220 of the generation.

In step 103, the frequency managing process 220 increments the usage frequency maintained in the usage frequency table 230.

In step 104, the frequency managing process 220 refers to the usage frequency table 230 so as to compare the usage frequency N with the permitted usage frequency P.

In step 105, when the usage frequency N≦the permitted usage frequency P, control is turned to step 106. Otherwise, control is turned to step 107.

In step 106, the execution process 240 is notified by the frequency managing process 220 that N≦P, and refers to the simulation condition/correct answer table 250 based on the random number generated in step 102. Control is turned to step 109.

In step 107, the execution process 240 is notified by the frequency managing process 220 that N>P, and sets the known reference number.

In step 108, the execution process 240 refers to the simulation condition/correct answer table 250 by the known reference number set in step 107.

In step 109, the execution process 240 displays the simulation condition.

In step 110, the execution process 240 executes a simulation based on the obtained simulation condition.

In step 111, when the simulation is completed, control is turned to step 112. If the simulation is still being executed, control is turned to step 110.

In step 112, when the simulation is completed, the correct answer is displayed.

Figure 4:
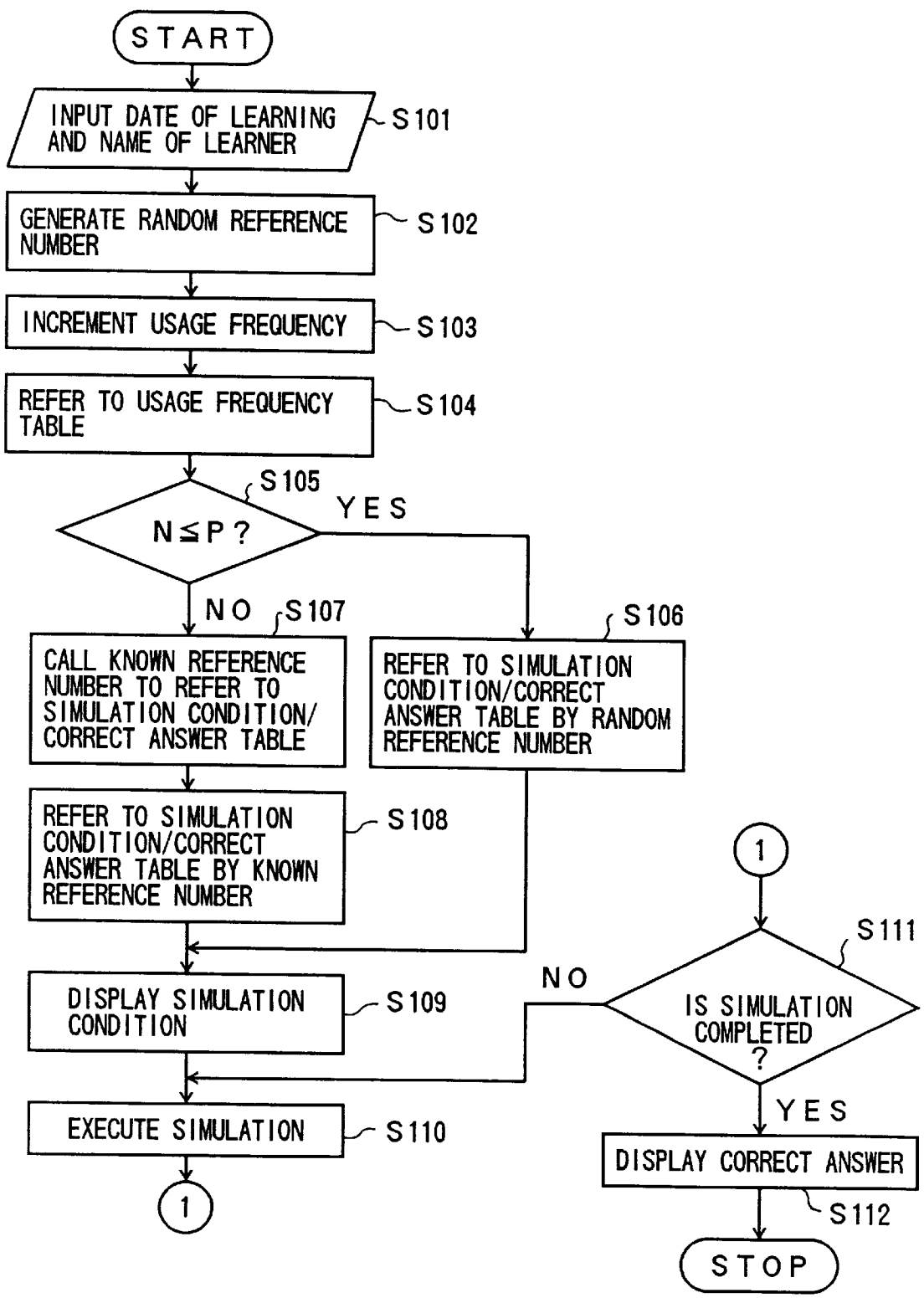
FIG. 4 is a flowchart showing an operation of a simulator usage controlling program according to the present invention.

The flowchart of FIG. 4 disregards a case where the simulation program is discontinued while being executed. A learning discontinuation flag may be provided so as to allow for such a case.

When learning takes place for the first time, the learning discontinuation flag may be set to "OFF". When the learning is discontinued, the learning discontinuation flag is set to "ON". A step for determining whether the learning discontinuation flag is set to "ON" or "OFF" may be provided so as to precede step 101. When it is determined in such a step that the learning discontinuation flag is set to "ON", control may be turned to step 110.

When learning is discontinued while the simulation program is being executed, the learning discontinuation flag may be set to "ON" between step 110 and step 111. With this arrangement, the usage frequency is not incremented when the simulation is re-started in the middle.

A description will now be given of random number generation performed by the random number generating process 210.

The random number generating process 210 generates a random number based on a YYYY/MM/DD input, the name of the learner and a character correspondence table, and sets a random number pattern. For example, the input data is turned into a score and the remainder (0–8) of the score divided by the random number may be made to correspond to ten random patterns.

In the following example, it is assumed that a trainer trains several learners on Nov. 1, 1997, using a simulation program that simulates budget preparation. Various simulation conditions concern the period before deadline and the scale of the project. FIG. 5 shows the simulation condition/correct answer table according to this assumption.

In the following description of the operation of the present invention, it is assumed that the permitted usage frequency is such that P=3, and the usage frequency table 230 stores N=1, indicating that the simulator was already used once.

In a first learning session, the learner sets a floppy disk or a CD-ROM storing the simulation program 100 in a recording medium drive, and provides an entry "Nov. 1, 1997" as the date of learning and "xxx" as the name of the learner (step 101).

The random number generating process 210 generates a random number so as to produce a random reference number "2" (step 102).

The frequency managing process 220 increments the usage frequency managed by the usage frequency table 230 so that N=2 is set (step 103).

The frequency managing process 220 compares the usage frequency with the permitted usage frequency stored in the usage frequency table 230 (step 104). Since N=2 and P=3 so that N<P (step 105), the execution process 240 refers to the simulation condition/correct answer table 250 by the random reference number 2 so as to obtain the simulation condition ("simulation condition B", indicating a period of five months and a project scale of 7 k steps) and the correct answer ("correct answer b", showing that the appropriate budget is sixty thousand dollars) (step 106).

Next, the execution process 240 displays the simulation condition ("simulation condition B", indicating the period of five months and the project scale of 7 k steps) obtained from the simulation condition/correct answer table 250, as shown in FIG. 6 (step 109). Subsequently, the execution process 240 executes the simulation (step 110). When the simulation program is completed (step 111), the correct answer (the appropriate budget=sixty thousand dollars) obtained in step 106 is displayed (step 112).

It is assumed that the simulation program 100 is executed for a second time on Nov. 2, 1997.

The learner sets a floppy disk or a CD-ROM storing the simulation program 100 in a recording medium drive, and provides an entry "Nov. 2, 1997" as the date of learning and "yyy" as the name of the learner (step 101).

The random number generating process 210 generates a random number so as to produce a random reference number "3" (step 102).

The frequency managing process 220 increments the usage frequency managed by the usage frequency table 230 so that N=3 set (step 103).

The frequency managing process 220 compares the usage frequency with the permitted usage frequency stored in the usage frequency table 230 (step 104). Since N=3 and P=3 so that N=P (step 105), the execution process 240 refers to the simulation condition/correct answer table 250 by the random reference number 3 so as to obtain the simulation condition ("simulation condition C", indicating a period of seven months and a project scale of 9 k steps) and the correct answer ("correct answer c", showing that the appropriate budget is eighty thousand dollars) (step 106).

Next, the execution process 240 displays the simulation condition ("simulation condition C", indicating the period of seven months and the project scale of 9 k steps) obtained from the simulation condition/correct answer table 250 (step 109). Subsequently, the execution process 240 executes the simulation (step 110). When the simulation program is completed (step 111), the correct answer (the appropriate budget=eighty thousand dollars) obtained in step 106 is displayed (step 112).

It is assumed that the simulation program 100 is executed for a third time on Nov. 3, 1997.

The learner sets a floppy disk or a CD-ROM storing the simulation program 100 in a recording medium drive, and provides an entry "Nov. 3, 1997" as the date of learning and "zzz" as the name of the learner (step 101).

The random number generating process 210 generates a random number so as to produce a random reference number "1" (step 102).

The frequency managing process 220 increments the usage frequency managed by the usage frequency table 230 so that N=4 is set (step 103).

The frequency managing process 220 compares the usage frequency with the permitted usage frequency stored in the usage frequency table 230 (step 104). Since N=4 and P=3 so that N>P (step 105), the execution process 240 sets "m" as a known reference number by which the simulation condition/correct answer table 250 is referred to (step 107). The execution process 240 refers to the simulation condition/correct answer table 250 by the known reference number 1 so as to obtain the simulation condition ("simulation condition M", indicating a period of eight months and a project scale of 10 k steps) and the correct answer ("correct answer m", showing that the appropriate budget is ninety thousand dollars) (step 106).

Next, the execution process 240 displays the simulation condition ("simulation condition M", indicating the period of eight months and the project scale of 10 k steps) obtained from the simulation condition/correct answer table 250 (step 109). Subsequently, the execution process 240 executes the simulation (step 110). When the simulation program is completed (step 111), the correct answer obtained in step 106 is displayed (step 112).

Since the usage frequency of N=4 exceeds the predetermined frequency of P=3, subsequent executions of the simulation program continue to display the same simulation condition and the same correct answer (appropriate budget= ninety dollars).

A license agreement in which the permitted usage frequency P stored in the usage frequency table is increased may be concluded. That is, the simulator may have the permitted usage frequency variably set depending on the contract price.

FIG. 7 shows an example of usage of the simulator according to the present invention.

Referring to FIG. 7, the fixed simulation condition M is displayed to the learner in the second and subsequent learning sessions (N≧2) using the simulator, and the correct answer m is displayed after the simulation. When a licensed learner uses the simulator, different simulation conditions are presented to the learner in the first two learning sessions. Generally, this provides sufficient opportunities for learning since most of the learning usually takes place during the first or second learning session. In the third and subsequent learning sessions, the same simulation condition is repeatedly used. However, the learner still benefits from the simulation by modifying the way the learner learns.

The two rows at the bottom of the table of FIG. 7 indicate what takes place when non-licensed learners use the simulator. A non-licensed learner benefits from the first learning session. In the second and subsequent learning sessions, however, training for non-licensed learners becomes difficult because the correct answer m for the simulation condition M may be distributed among the learners.

The present invention is also useful to discourage other types of illegal usage.

When a purchased simulator is used to train different learners, it is likely that the correct answer is communicated to the third and subsequent learners.

In a mass training, a total of twenty simulators may be purchased to train twenty learners at a time. As this process is repeated, it is likely that the correct answer is communicated to the learners in the second and subsequent processes.

When a task provided by a simulator is used, for example, as an achievement test, a trainer cannot achieve the objective with such an illegal usage. Thus, the present invention encourages the purchase of simulators.

The present invention is not limited to the above-described embodiments, and variations and modifications may be made without departing from the scope of the present invention.

What is claimed is:

1. A method of controlling usage of a simulator sold to train a licensed user, for discouraging the simulator from being used by non-licensed learners beyond a predetermined number of times prescribed by a license agreement, comprising:

setting a predetermined number of times that the simulator may be used;

incrementing a count indicating a frequency of usage every time the simulator is used;

setting a random simulation condition of the simulator while the count is lower than or equal to the predetermined number of times; and when the count exceeds a predetermined number of times, setting a fixed simulation condition with respect to the simulator instead of said random simulation condition.

2. The method of controlling usage of a simulator as claimed in claim 1, wherein the count is prevented from being incremented when a use of the simulator is discontinued during a simulation.

3. A system of controlling usage of a simulator sold to train a licensed user, for discouraging the simulator from being used by non-licensed learners beyond a predetermined number of times prescribed by a license agreement, comprising:

usage frequency incrementing means for incrementing a count indicating a frequency of usage every time the simulator is used;

random condition setting means for setting a random simulation condition of the simulator while the count is lower than or equal to the predetermined number of times; and when the count exceeds a predetermined number of times, a fixed condition setting means for setting a fixed simulation condition with respect to the simulator instead of said random simulation condition, wherein said system is contained in a computer-executable program.

4. The system as claimed in claim 3, wherein said random condition setting means includes means for randomly generating, while the count is lower than or equal to the predetermined number of times, a reference number for referring to a table containing simulation conditions related to respective reference numbers and associated correct answers, and wherein said fixed condition setting means includes means for setting a number for referring to the table, when the count exceeds the predetermined number of times.

5. The system as claimed in claim 4, wherein said usage frequency incrementing means includes means for preventing the count from being incremented when a use of the simulator is discontinued during a simulation.

6. A recording medium which stores a program for controlling usage of a simulator sold to train a licensed user by discouraging the simulator from being used by non-licensed learners beyond a predetermined number of times permitted in a license agreement, said program comprising:

a usage frequency incrementing process for incrementing a count indicating a frequency of usage every time the simulator is used;

a random condition setting process for setting a random simulation condition of the simulator while the count is lower than or equal to the predetermined number of times; and when the count exceeds a predetermined number of times, a fixed condition setting process for setting a fixed simulation condition with respect to the simulator instead of said random simulation condition.

7. The recording medium as claimed in claim 6, wherein said random condition setting process includes a process for randomly generating, while the count is lower than or equal to the predetermined number of times, a reference number for referring to a table containing simulation conditions related to respective reference numbers and associated correct answers, and wherein said fixed condition setting process includes a process for setting a number for referring to the table, when the count exceeds the predetermined number of times.

8. The recording medium as claimed in claim 7, wherein said usage frequency incrementing process includes a process for preventing the count from being incremented when a use of the simulator is discontinued during a simulation.

9. A method of controlling usage of a simulator, comprising:

setting a predetermined number of times that the simulator may be used;

incrementing a count indicating a frequency of usage every time the simulator is used;

setting a random simulation condition of the simulator while the count is lower than or equal to the predetermined number of times; and when the count exceeds the predetermined number of times, setting a fixed simulation condition with respect to the simulator instead of said random simulation condition.

10. A system for controlling usage of a simulator, comprising:

usage frequency incrementing means for incrementing a count indicating a frequency of usage every time the simulator is used;

random condition setting means for setting a random simulation condition of the simulator while the count is lower than or equal to a predetermined number of times; and when the count exceeds the predetermined number of times, a fixed condition setting means for setting a fixed simulation condition with respect to the simulator instead of said random simulation condition.

11. A recording medium which stores a program for causing a computer to control usage of a simulator software, comprising:

means for causing the computer to increment a count indicating a frequency of usage every time the simulator software is used;

means for causing the computer to set a random simulation condition of the simulator software while the count is lower than or equal to a predetermined number of times; and when the count exceeds the predetermined number of times, means for causing the computer to set a fixed simulation condition with respect to the simulator software instead of said random simulation condition.

12. An apparatus comprising:

a usage frequency incrementing device incrementing a count indicating a frequency of usage every time a simulator is used;

a random condition setting device setting a random simulation condition of the simulator while the count is lower than or equal to a predetermined number of times; and when the count exceeds the predetermined number of times, a fixed condition setting device setting a fixed simulation condition with respect to the simulator instead of said random simulation condition.

13. An apparatus comprising:

a first setting device setting a predetermined number of times that a simulator may be used;

an incrementing device incrementing a count indicating a frequency of usage every time the simulator is used;

a second setting device setting a random simulation condition of the simulator while the count is lower than or equal to the predetermined number of times; and when the count exceeds the predetermined number of times, a third setting device setting a fixed simulation condition with respect to the simulator instead of said random simulation condition.

14. A system of controlling usage of a simulator sold to train a licensed user, for discouraging the simulator from being used by non-licensed learners beyond a predetermined number of times prescribed by a license agreement, comprising:

usage frequency incrementing means for incrementing a count indicating a frequency of usage every time the simulator is used;

random condition setting means for setting a simulation condition of the simulator randomly while the count is lower than or equal to the predetermined number of times;

fixed condition setting means for setting a fixed simulation condition with respect to the simulator when the count exceeds the predetermined number of times, wherein, said random condition setting means includes means for randomly generating, while the count is lower than or equal to the predetermined number of times, a reference number for referring to a table containing simulation conditions related to respective reference numbers and associated correct answers, said fixed condition setting means includes means for setting a number for referring to the table, when the count exceeds the predetermined number of times, and said system is contained in a computer-executable program.

15. The system as claimed in claim 14, wherein said usage frequency incrementing means includes means for preventing the count from being incremented when a use of the simulator is discontinued during a simulation.

16. A recording medium which stores a program for controlling usage of a simulator sold to train a licensed user by discouraging the simulator from being used by non-licensed learners beyond a predetermined number of times permitted in a license agreement, said program comprising:

a usage frequency incrementing process for incrementing a count indicating a frequency of usage every time the simulator is used;

a random condition setting process for setting a simulation condition of the simulator randomly while the count is lower than or equal to the predetermined number of times;

a fixed condition setting process for setting a fixed simulation condition with respect to the simulator when the count exceeds the predetermined number of times, wherein, said random condition setting process includes a process for randomly generating, while the count is lower than or equal to the predetermined number of times, a reference number for referring to a table containing simulation conditions related to respective reference numbers and associated correct answers, and said fixed condition setting process includes a process for setting a number for referring to the table, when the count exceeds the predetermined number of times.

17. The recording medium as claimed in claim 16, wherein said usage frequency incrementing process includes a process for preventing the count from being incremented when a use of the simulator is discontinued during a simulation.

* * * * *